United States Patent
Adams et al.

(10) Patent No.: US 6,195,732 B1
(45) Date of Patent: Feb. 27, 2001

(54) STORAGE DEVICE CAPACITY MANAGEMENT

(75) Inventors: Donald E. Adams, Pleasanton; Robert S. Cohn, Los Gatos, both of CA (US)

(73) Assignee: Quantum Corp., Milpitas, CA (US)

( * ) Notice: Subject to any disclaimer, the term of this patent is extended or adjusted under 35 U.S.C. 154(b) by 0 days.

(21) Appl. No.: 09/235,613

(22) Filed: Jan. 22, 1999

(51) Int. Cl.[7] .................................................. G06F 12/00
(52) U.S. Cl. ........................ 711/156; 711/163; 711/167; 711/170
(58) Field of Search .................. 711/156, 163, 711/167, 170

(56) References Cited

U.S. PATENT DOCUMENTS

| | | | | |
|---|---|---|---|---|
| 5,774,551 | * | 6/1998 | Wu et al. ............................... | 713/155 |
| 6,061,449 | * | 5/2000 | Candelore et al. ..................... | 380/28 |
| 6,076,137 | * | 6/2000 | Asnaashari ............................. | 711/103 |
| 6,088,766 | * | 7/2000 | Bachmat et al. ....................... | 711/114 |
| 6,101,588 | * | 8/2000 | Farley ..................................... | 711/168 |

* cited by examiner

Primary Examiner—John W. Cabeca
Assistant Examiner—Fred F. Tzeng
(74) Attorney, Agent, or Firm—Michael Zarrubian

(57) ABSTRACT

In a data processing system comprising a host system and a memory device including a data storage medium of a predetermined size and corresponding capacity, a secure method of managing available capacity of the storage medium by: maintaining an authentication list comprising a plurality of entries including information uniquely identifying a plurality of memory devices; selecting a section of said data storage medium for data storage, said section having a size representing the available capacity of the memory device; and maintaining identification information in the memory device uniquely identifying the memory device. Further, in response to receipt in the host system of a request for changing the available capacity of the memory device: obtaining information from said memory device including said identifying information; searching said list to find an entry including identification information matching that obtained from the memory device to authorize said change; and if a match is found, then: generating a change command for directing the memory device to change said available capacity; sending the change command to the memory device; and the memory device executing said change command by steps including changing the size of said section.

32 Claims, 5 Drawing Sheets

STORAGE DEVICE CAPACITY MANAGEMENT

FIELD OF THE INVENTION

The present invention relates generally to managing memory device capacity and, more particularly, to managing disk drive capacity by secure methods.

BACKGROUND

A typical data disk drive includes at least one data disk where virtually the entire capacity of the data disk is available for data storage. A small portion of the data disk is set aside as a system area for storing system related information. The data disk is configured by the factory or by an OEM to exclude the system area from general access. As such, the system area remains "locked" or unavailable for storing user data.

Managing or changing the available capacity of such a disk drive after the disk drive has been placed in service in a data processing system requires reconfiguration of the disk drive to "unlock" the system area. Reconfiguration is performed by the OEM, or by an end user, by performing a series of steps commanding the disk drive to, for example, make at least a portion of the system area available for limited access. However, the capacity unlocked is a small fraction of the native capacity of the hard disk, and the user virtually does not gain any additional useable storage capacity from the hard disk Further, due to the minimal amount of hard disk capacity unlocked, there has not been a need for robust security methods to prevent widespread unauthorized reconfiguration of the disk drive and use of the system area. As such, existing security methods are not suited to deter prohibited access to protected areas on the data disk or to prevent illegal reconfiguration of the hard disk drive.

With the increasing capacity offered by data disk drives and other memory devices, it is highly desirable to securely manage the amount of the available capacity to enable commercial models such as "fee for use". There is, therefore, a need for a system and a method of managing the available capacity of disk drives and memory devices while in service in various data processing systems. There is also a need for such a system and method to provide an efficient and robust security process for preventing unauthorized use of said available capacity.

SUMMARY

The present invention satisfies these needs. In one embodiment, the present invention provides a method of securely managing available storage capacity of a memory device in a data processing system comprising a host system and said memory device. The memory device, such as a data disk drive, includes a data storage medium of a predetermined size and corresponding capacity. A secure method of managing the available capacity of the storage medium, according to the present invention, comprises the steps of: (a) maintaining an authentication list comprising a plurality of entries including information uniquely identifying a plurality of memory devices such as the disk drive; (b) selecting a section of said data storage medium for data storage, said section having a size representing the available capacity of the memory device; (c) maintaining identification information in the memory device uniquely identifying the memory device; and (d) in response to receipt in the host system of a request for changing the available capacity of the memory device, performing steps including: (1) obtaining information from said memory device including said identifying information; and (2) searching said list to find an entry including identification information matching that obtained from the memory device to authorize said change. If a match is found, then: (1) generating a change command for directing the memory device to change said available capacity; (2) sending the change command to the memory device; and (3) the memory device executing said change command by steps including changing the size of said section.

The step of obtaining the identification information from the memory device includes: (1) sending an inquiry command to the memory device requesting said unique identification information, and (2) the memory device providing said identification information stored therein in response. Preferably, the step of providing said unique identification information includes encoding said identification information; and the step of finding a match in the authentication list further includes: (1) decoding the encoded identification information; and (2) comparing the decoded identification information with the identification information in the authentication list.

Further, preferably the step of generating the change command includes: (1) encoding the matching identification information found in the authentication list; and (2) incorporating the encoded identification information in the change command. Further, the step of executing the change command includes: (1) decoding the encoded identification information in the change command; (2) comparing the decoded identification information with the identification information in the memory device; and (3) if there is a match then changing the size of said section.

In another embodiment, the data processing system further comprises a remote host system, and the method of present invention comprises the steps of: (a) maintaining an authentication list in the remote host system, the list comprising a plurality of entries including information uniquely identifying a plurality of memory devices; (b) selecting a section of the storage medium for data storage, said section having a size representing the available capacity of the memory device; (c) maintaining identification information in the memory device uniquely identifying the memory device; and (d) in response to receipt in the local host system of a request for changing the available capacity of the memory device: (1) obtaining information from said memory device including said identifying information; (2) sending the obtained identification information to the remote host system; and (3) searching said list in the remote host system to find an entry including identification information matching that obtained from the memory device to authorize said change. If a match is found, then: (1) generating a change command in the local host system for directing the memory device to change said available capacity; (2) sending the change command to the memory device; and (3) the memory device executing said change command by changing the size of said section.

In another aspect, the present invention also provides a capacity control system for securely managing available storage capacity of said memory device in a data processing system. In one embodiment, the capacity control system comprises: (a) an authentication list comprising a plurality of entries including information uniquely identifying a plurality of memory devices; and (b) a host system configured by program instructions to perform steps including: in response to receipt in the host system of a request for changing the available capacity of the memory device: (1) sending an identification inquiry command to the memory device requesting said unique identification information; (2) searching said list to find an entry including identification information matching that obtained from the memory device to authorize said change; and (3) if a match is found, then: generating a change command for directing the memory device to change said available capacity; and sending the change command to the memory device.

The capacity control system further comprises a logic circuit in the memory device configured by program instructions to perform steps including: in response to an identification inquiry command, providing said identification information stored in the memory device; and in response to a change command, executing steps including changing the size of said section of the data storage medium. Preferably, the logic circuit program instructions for providing said unique identification information include program instructions for encoding said identification information; and the host system program instructions for finding a match in the authentication list further include program instructions for decoding the encoded identification information, and comparing the decoded identification information with the identification information in the authentication list.

Preferably, the host system program instructions for generating the change command include program instructions for encoding the matching identification information found in the authentication list; and incorporating the encoded identification information in the change command. Further, the logic circuit program instructions for executing the change command include program instructions for: decoding the encoded identification information in the change command; comparing the decoded identification information with the identification information in the memory device; and if there is a match, then changing the size of said section of the data storage medium.

Yet in another aspect, the present invention also provides a capacity control system for securely managing available storage capacity of said memory device in a data processing system, wherein the capacity control system comprises a remote host system configured by program instructions to perform steps including: (1) maintaining an authentication list therein comprising a plurality of entries including information uniquely identifying a plurality of memory devices; (2) upon receiving an authentication request for authenticating identification information of a memory device, searching said list to find an entry containing identification information matching that requested; and (3) if a match is found, providing validation information in response to said request, otherwise providing rejection information in response to said request.

The capacity control system further comprises a local host system configured by program instructions to perform steps including: in response to receipt in the local host system of a request for changing the available capacity of the memory device: (1) sending an identification inquiry command to the memory device requesting said unique identification information; (2) sending an authentication request command to the remote host with the identification information obtained from the memory device to authorize said change; and (3) upon receiving validation information from the remote host performing steps including: (i) generating a change command for directing the memory device to change said available capacity; and (ii) sending the change command to the memory device. The capacity control system further comprises a logic circuit in the memory device configured by program instructions to perform steps including: (1) in response to an identification inquiry command, providing said identification information stored in the memory device; and (2) in response to a change command, executing steps including changing the size of said section of the data storage medium.

DRAWINGS

These and other features, aspects and advantages of the present invention will become better understood with regard to the following description, appended claims and accompanying drawings where:

DESCRIPTION

Figure 1:
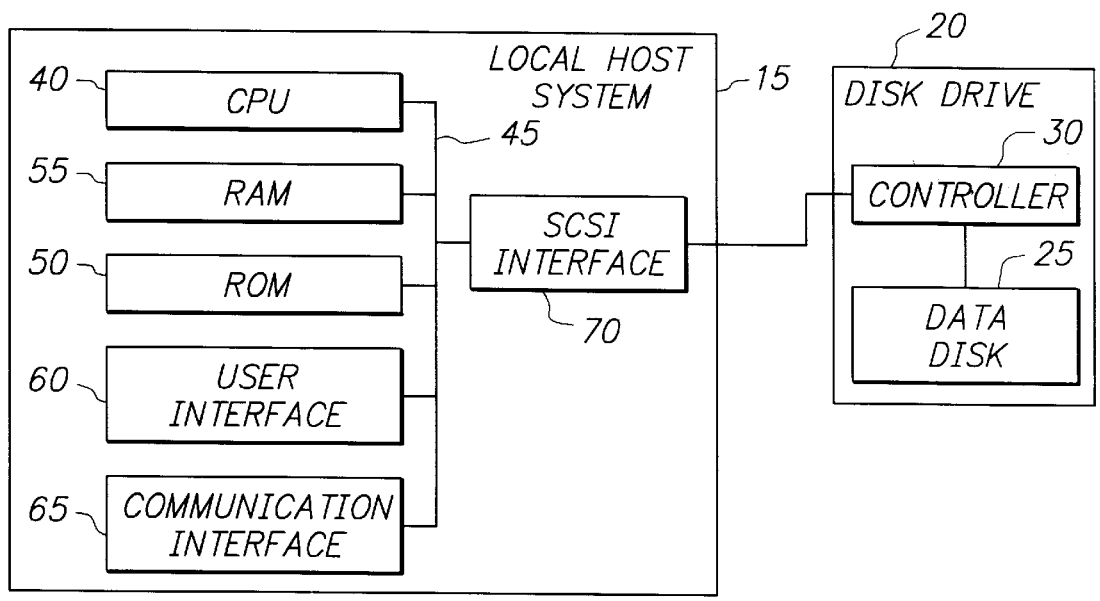
FIG. 1 shows a block diagram of an example data processing system architecture in which the present invention can be implemented.

FIG. 1 shows a block diagram of an example data processing system 10 in which a method embodying aspects of the present invention can be implemented. The data processing system 10 typically includes a local host system 15 and a memory device, such as a data disk drive 20, interconnected as shown. The disk drive 20 comprises a storage medium such a data disk 25 having a size and corresponding capacity, and a disk controller 30 for interfacing with the host system 15 and controlling disk drive operations. As those skilled in the art will recognize, the present invention is capable of being implemented in data processing systems having other memory and storage devices. Additionally, the local host 15 generally refers to a host with a SCSI interface, which one skilled in the art will recognize to include, for example, a CPU 40 interconnected via a BUS 45 to a ROM 50, a RAM 55, a user interface 60, a communication interface 65 for communicating with other host systems, and a SCSI interface 70. Although in the example embodiment described herein a SCSI interface is described, other interfaces such as IDE/ATA and 1394 (Firewire) can also be used. The present invention can also be utilized in a data processing system having a plurality of local hosts 15 and data disk drives 20.

Figure 3:
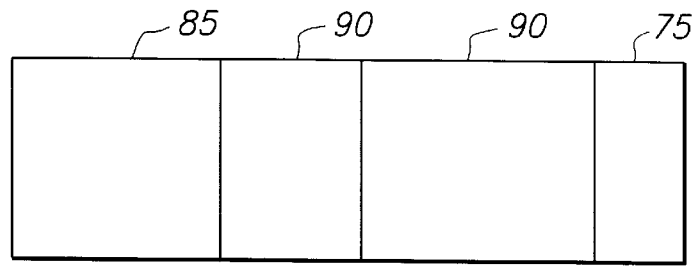
FIG. 3 illustrates a representation of partitioning the capacity of the data disk of FIG. 1 according to the present invention.
Figure 4:
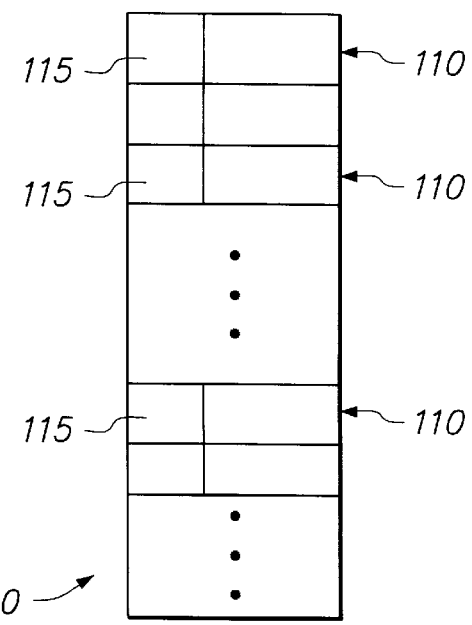
FIG. 4 illustrates a representation of an authentication list according to the present invention.
Figure 2:
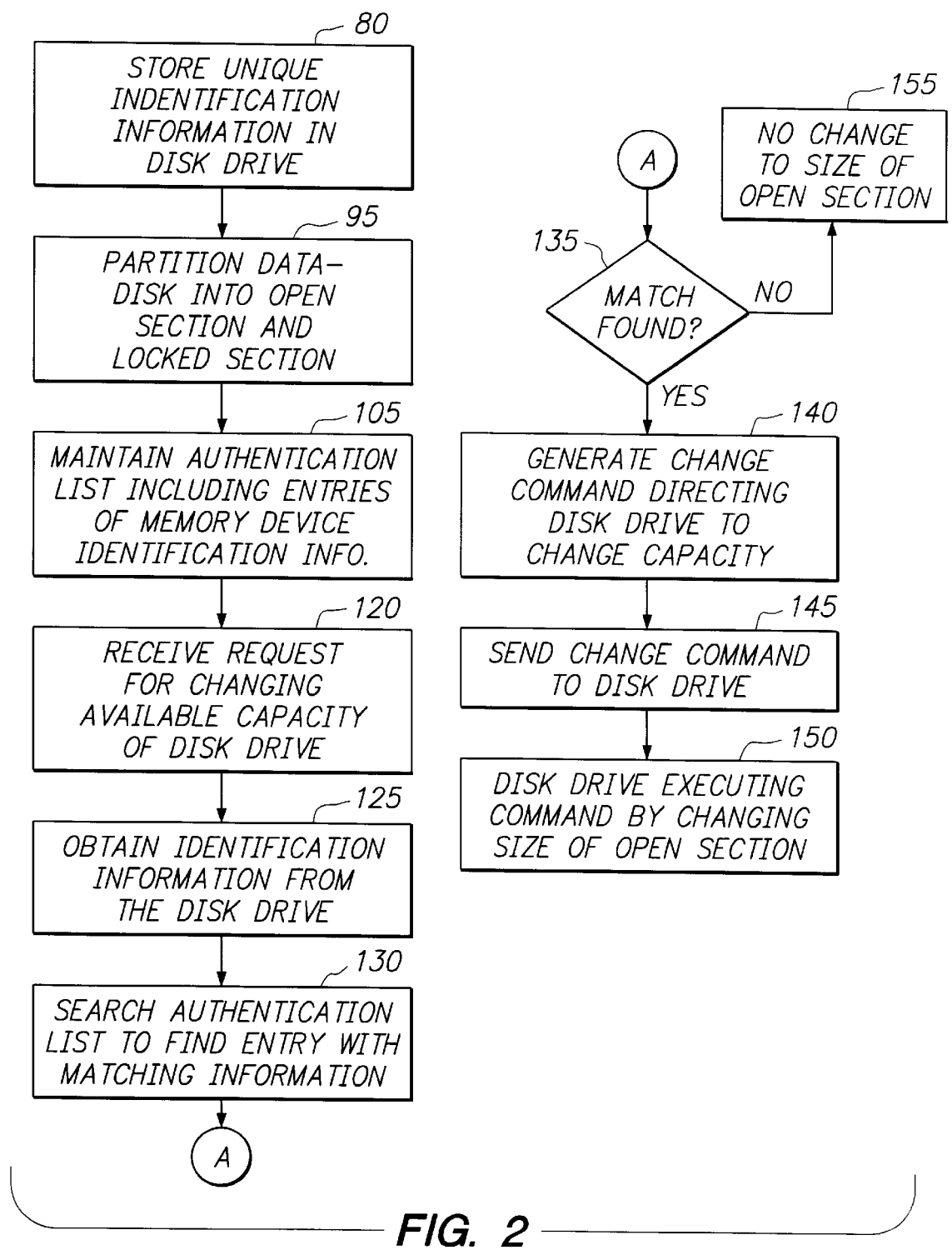
FIG. 2 shows an embodiment of a method of managing available capacity of the disk drive of FIG. 1, according to the present invention.

Referring to FIGS. 2–4, in an embodiment of the method of the present invention, verification information 75 is stored in the disk drive 20, including identification information uniquely identify the disk drive 20 (step 80). The data disk 25 is partitioned into an open section 85 and at least one protected, or locked, section 90 as shown in FIG. 3 (step 95). When the disk drive 20 is initially integrated into the data processing system 10, the open section 85 is available for data storage, while the protected section 90 remains locked and unavailable. The open section 85 represents the initial capacity of the disk drive 20 available for data storage. As shown in FIG. 4, an authentication list 100 is utilized to enable changing or managing the capacity of the disk drive securely (step 105). The authentication list 100 comprises a plurality of entries 110 including memory device identification information 115 uniquely identifying a plurality memory devices such as the data disk drive 20.

Referring back to FIG. 2, managing the available capacity of the disk drive 20 in response to receipt of a request in the local host system 15 for changing the capacity of the disk drive 20 (step 120), includes the steps of: obtaining verification information from said disk drive 20 including said disk identifying information 75 (step 125); and searching said list 100 to find an entry 110 including device identification information 115 matching the disk information 75 obtained from the disk drive 20 to authorize said change (step 130). If a match is found (step 135), then: generating a change command for directing the disk drive 20 to change said available capacity (step 140); sending the change command to the disk drive 20 (step 145); and the disk drive 20 executing said change command by steps including changing the size of said open section 85 (step 150). Otherwise, if a match is not found in step 135, the size of the open section 85 is not changed (step 155).

The step 125 of obtaining the identification information from the disk drive 20 includes: (a) sending an inquiry command to the disk drive 20 requesting said unique identification information 75; and (b) the disk drive 20 providing said identification information 75 stored therein in response. Preferably, the step of providing said unique identification information 75 further includes encoding said identification information 75; and the step 130 of finding a match in the authentication list 100 further includes: (a) decoding the encoded identification information; and (b) comparing the decoded identification information with the device identification information 115 in the authentication list 100 to find a match.

Further, preferably the step 140 of generating the change command further includes: (a) encoding the matching identification information 115 found in the authentication list 110; and (b) incorporating the encoded identification information in the change command. And, the step 150 of executing the change command further includes: (a) decoding the encoded identification information in the change command; (b) comparing the decoded identification information with the identification information 75 in the disk drive 20; (c) and if there is a match, then changing the size of said open section 85.

Figure 5:
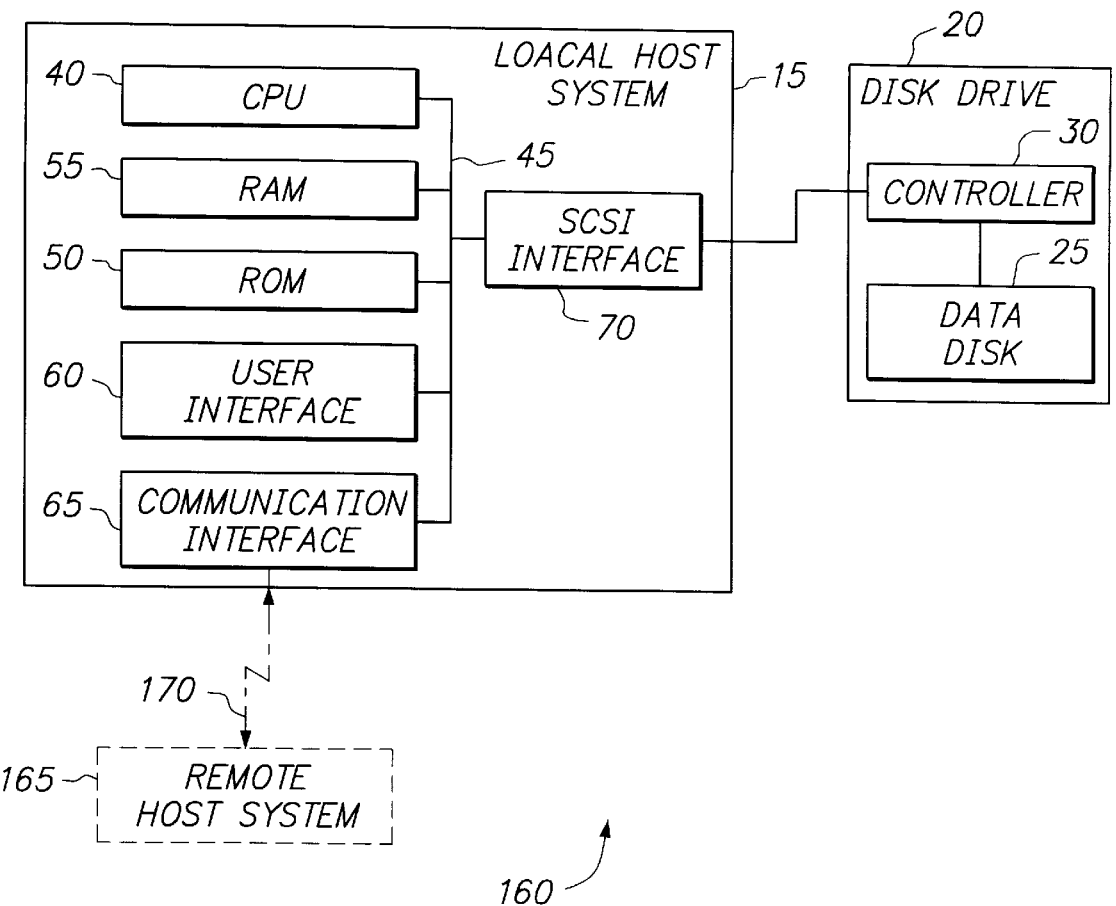
FIG. 5 shows a block diagram of an embodiment of a capacity management system according to the present invention.
Figure 6:
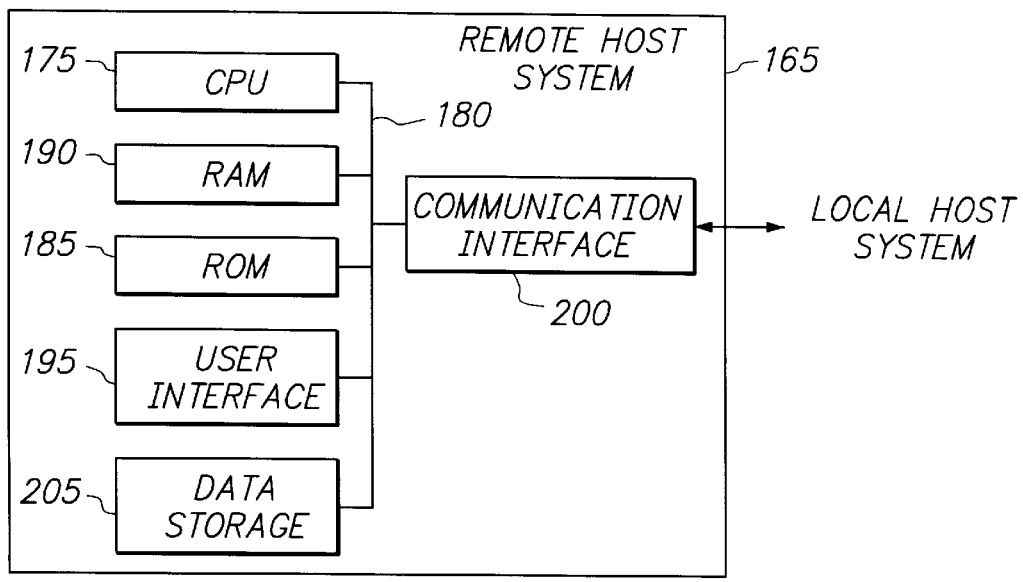
FIG. 6 shows a block diagram of an embodiment of the remote host system of the capacity management system of FIG. 5.

In another aspect, the method of the present invention is implemented as program instructions to configure a data processing system to form a capacity control system for securely managing the available storage capacity of a memory device such as the disk drive 20. Referring to FIG. 5, in one embodiment, a capacity control system 160 according to the present invention includes the aforementioned disk drive controller 30 and local host system 15 configured by program instructions to perform the steps of the method of the present invention. The capacity control system 160 can further include a remote host system 165 interconnected to the local host system 15 via a network communication link 170. As shown in FIG. 6, the remote host system 165 comprises a CPU 175 interconnected via a BUS 180 to a ROM 185, a RAM 190, a user interface 195, a communication interface 200 for communicating with other host systems such as the local host system 15, and a data storage 205.

Figure 7:
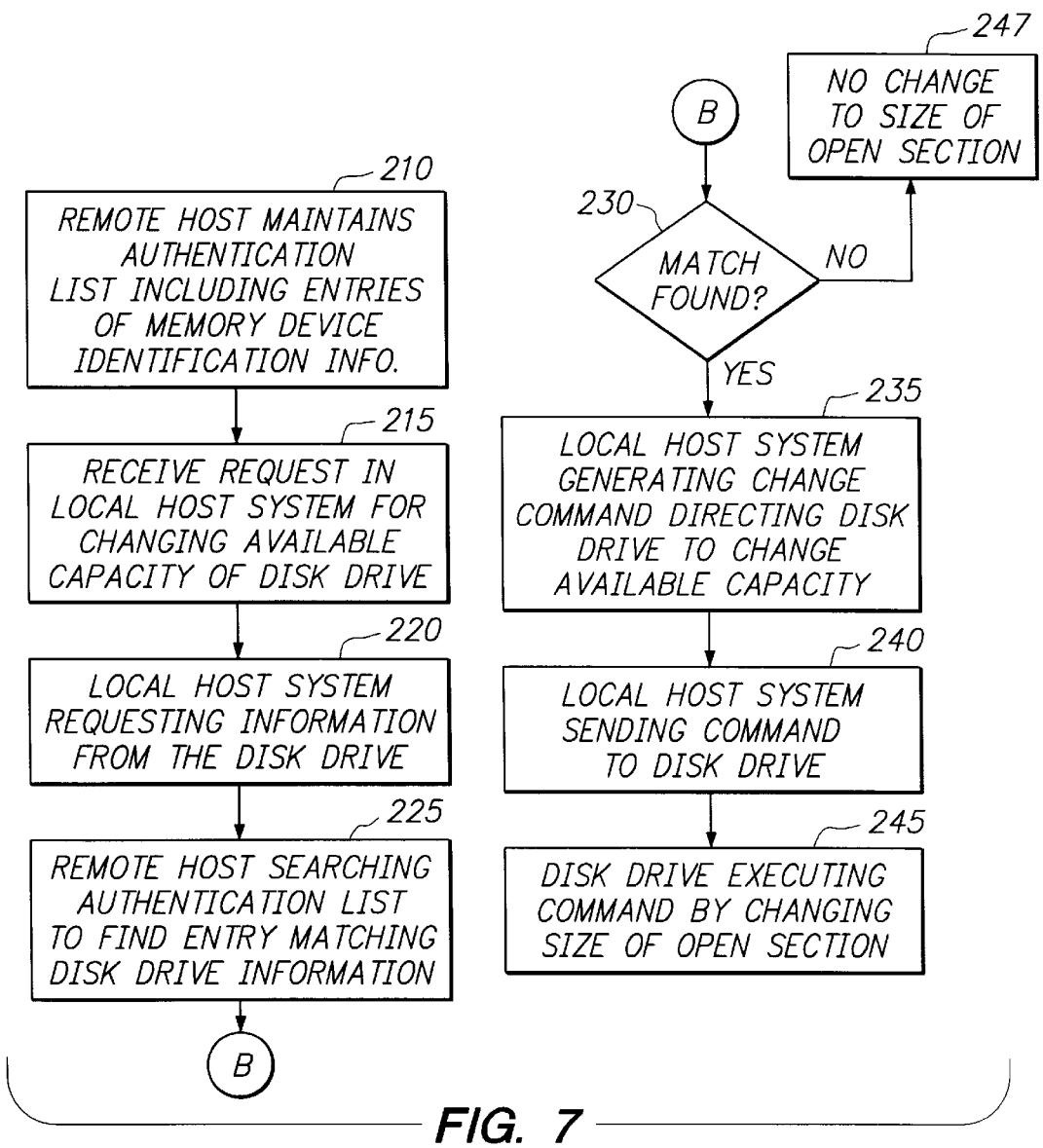
FIG. 7 shows another embodiment of a method of managing available capacity of the disk drive of FIG. 5, according to the present invention.

The remote host system 165, the local host system 15 and the disk controller 30 are configured by program instructions according to an embodiment of the method of the present invention including the steps shown in FIG. 7. The remote host system 165 maintains the authentication list 100 and performs functional operations on the list 100 (step 210). In response to receipt of a request in the local host system 15 for changing the available capacity of the disk drive 20 (step 215), the local host system 15 obtains information from the disk drive 20 including said identifying information 75 and sends the obtained identification information 75 to the remote host system 165 (step 220). The remote host system 165 searches said list 100 to find an entry 110 including device identification information 115 matching the identification information 75 obtained from the disk drive 20 to authorize said change and communicates the search results to the local host system 15 (step 225). If a match is found (step 230), then the local host system 15 generates a change command for directing the disk drive 20 to change said available capacity (step 235), and sends the change command to the disk drive 20 (step 240). The disk drive 20 executes the change command by changing the size of said open section 85 (step 245). If a match is not found in step 230, the disk capacity remains unchanged (step 247).

Figure 8:
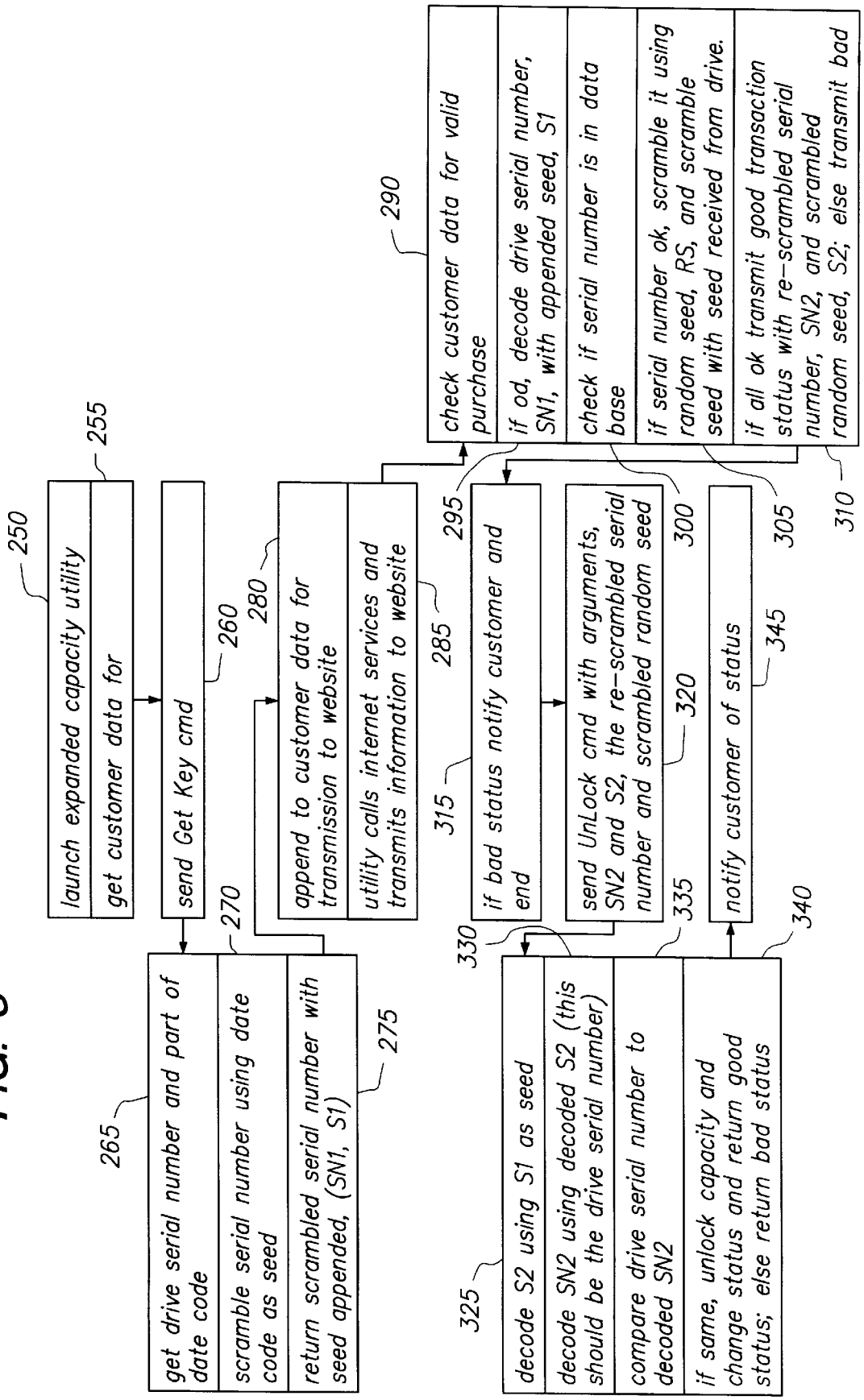
FIG. 8 shows a flowchart of the steps of an example implementation of the method of present invention for configuring the capacity management system of FIG. 5.

FIG. 8 shows a flowchart of an example implementation of the above method as program instructions for configuring the capacity control system 160. The remote host system 165 is configured as an Internet website utility and maintains the authentication list 100 and user related information in a database in the data storage 205 therein. The local host system 15 comprises a personal computer system interconnected to the remote host system 165 via the network communication link 170. The local host system 15 accesses the remote host system 165 via a modem interconnected to the remote host system 165 via the communication link 170 such as telephone lines. The local host system 15 utilizes said disk drive 20 for data storage.

In an example operation scenario, a user customer utilizes the user interface 60 in the local host system 15 to launch a utility program for expanding the available capacity of the disk drive 20 (step 250). The local host utility program obtains customer data, such as purchase information, from the customer (step 255). The local host utility then generates and sends a Get Key command to the disk controller 30 to obtain the disk drive identification information 75 (step 260). The disk drive 20, under direction of firmware in the disk controller 30: (a) obtains identification information 75 stored therein including a unique serial number and part of a date code S1 (step 265); (b) encodes or scrambles the serial number using the date code S1 as a seed (step 270), and (c) returns the scrambled serial number SN1 and the seed S1 to the local host utility (step 275). The local host utility then appends the customer data to the identification information 75 (step 280); and establishes a connection with the remote host system 165 via an Internet connection and transmits the scrambled serial number SN1, the seed S1 and customer data to the remote host system 165 (step 285).

The remote host website utility program searches the authentication list 100 in the data base for the customer information to validate purchase of the disk drive 20 by the customer (step 290). If the purchase is validated, the website utility decodes the scrambled serial number SN1 using the seed S1 (step 295), and then checks the device information 115 in the entries 110 of the authentication list 100 to find a match for the decoded serial number (step 300). If the serial number is found, then the website utility: (a) scrambles the serial number using a random seed RS to generate an encoded serial number SN2, and scrambles the random seed RS using the seed S1 to generate an encoded seed S2 (step 305), and (b) returns the scrambled serial number SN2 and the encoded random seed S2 to the local host system (step 310). Otherwise, the website utility system returns a bad status to the local host system 15.

If the local host system 15 receives a bad status from the remote host system 165, the local host utility informs the user of such and ends the procedure (step 315), otherwise, the local host utility generates and sends an UnLock command with encoded serial number SN2 and random seed S2 to the disk drive controller 30 (step 320). The disk controller 30 decodes the encoded random seed S2 using the seed S1 therein (step 325), and then decodes the encoded serial number SN2 using the decoded random seed (step 330). The disk controller 30 then compares the decoded serial number with the serial number stored in the disk drive 20 (step 335). If a match is found, the disk controller 30 increases the available capacity of the disk drive 20 by unlocking the protected section 90 of the data disk 25, and returns good status to the local host system 15 (step 340). If a match is not found in step 335, the disk controller 30 returns bad status to the local host system 15. The local host utility then informs the user of the returned status (step 345). Unlocking the protected section 90 includes increasing the size of the open section 85 by a predetermined amount or by a value specified by the customer or in the authentication list 100.

Therefore, according to the above embodiment of the present invention, information exchange and authentication is initiated and managed by the local host system 15 between the disk drive 20 and the remote host system 165. Serial number encryption and validation occur only in the disk drive 20 and at the remote host system 165. The local host system 15 serves only as a conduit for the encrypted serial number making unauthorized deciphering of the serial number very difficult. Although the disk drive serial number is stored in the disk drive 20 to uniquely identify the disk drive 20, other unique identifying information can also be utilized. Encrypting the disk drive's unique serial number allows the encryption/decryption methods common for different disk drives 20 utilized in corresponding local host systems 15 such a personal computers, for example. As such, the method of the present invention, can be utilizes simply and efficiently to securely manage the capacity of multiple disk drives 20 each with a unique serial number stored therein. The encoding and decoding procedures described above can be selected from existing encryption protocols which utilize a seed for encoding and decoding.

Although in the above example, the authentication list 100 is maintained in the remote host system 165, and the local host system 15 exchanges information with the remote host system 165 via the communication link 170 to authorize the disk drive capacity change, other means of obtaining authorization from the remote host system 165 are also possible and contemplated by the present invention. For example, the user can place a telephone call to operators at the disk drive's manufacturer and provide the user's information to the operators. The operators then check the authentication list 100 stored in the remote host 165, and upon validating the user information, provide the user with information for the local host system 15 to direct the disk drive 20 to change said available capacity.

Preferably, the disk drive 20 stores therein an indication of the changed available capacity. Such indication can be stored in a configuration page on the data disk 25 for access by the disk controller 30. In that case, the encrypted SN2 and S2 information can be stored in the configuration page to prevent an unauthorized change in the configuration page information. Further, after a power cycle, the disk controller 30 can re-check said stored information by methods discussed above to determine unlocked capacity.

Though in the above example scenario, the available capacity of the disk drive 20 is increased or unlocked, the present invention also contemplates decreasing or locking available capacity of the disk drive 20. In that case using the above security measures for locking capacity is optional. In one embodiment, the user launches an unlock utility program in the local host 15 without using decoding information such as SN2 and S2. Alternatively, the unlock utility program can be launched in the local host system 15 by a command from the remote host system 165 via the communication link 170. The local host utility generates a Lock command and sends the Lock command to the disk controller 30 with an indication of the amount of the capacity to be locked. The disk controller 30 executes the Lock command by decreasing the size of the open section 85 by the indicated amount.

In another aspect, the method of the present invention allows unlocking the capacity of the disk drive 20 for a limited time period T such as hours or days. In that case, the time period T is provided either by the customer, or by the remote host system 165, and sent to the disk drive 20 by the local host 15 as an additional scrambled argument to the Unlock command described above. The disk controller 30 then unscrambles the time period T and utilizes it in an internal timer to inform the disk controller 30 to relock the unlocked capacity when the time period T has expired. The disk controller 30 also re-scrambles the time period T value for storage in said configuration page. At subsequent power up, the disk controller 30 retrieves the time period T from the configuration page and compares it against a current timer value Y. If the timer value Y is less than the time period T, and the stored SN2 value is valid, then the unlocked capacity remains available. Otherwise, if the timer value Y is greater than or equal to the time period T, or the stored SN2 value is invalid, then the unlocked capacity is re-locked and the corresponding configuration page values are updated. The disk controller 30 relocks the unlocked capacity according to the aforementioned locking procedure.

In implementation, an encoder operator $S(a,b)$ utilizes parameter a as the value to be encoded and parameter b as an encoding seed. A decoding operator $IS(c,d)$ utilizes parameter c as the value to be decoded and parameter d as a decoding seed. The operators S and IS are applied to the aforementioned example, where the seed values b and d are dropped from the notation as being implied. The decoded value SN2 is obtained from the decoding operator $IS(SN2, IS(S2))$, and the decoded value T is obtained from the decoding operator $IS(T)$. If the decoded SN2 does not match the serial number stored in the disk drive, then the disk drive capacity is not unlocked. If the decoded SN2 matches the serial number stored in the disk drive, then the disk drive capacity is unlocked depending on the decoded value of T as follows. If decoded value of T is 0, then the user has purchased the disk drive, whereby the disk drive capacity is unlocked for general use, and the values of S2 and decoded SN2 and T are stored in the hard disk drive configuration page. If the decoded value of T is, for example, greater than 29 days then the user has rented the disk drive capacity, whereby the disk drive capacity if unlocked for the specified time period. If the decoded value of T is, for example, greater than 1 day, but less than 29 days, than the user has purchased a record-once and play-once capacity, whereby the disk drive capacity is unlocked, desired data is stored thereon one, and then read only once.

An example of encoding and decoding protocol implemented as a cipher/decipher engine is described herein. In cipher mode the engine encodes the serial number in the disk drive and in decipher mode the engine decodes the serial number. The engine uses four digits of the serial number and a 3-bit seed ci for cipher. In cipher mode the engine uses a cipher function represented by the relation $y_n = x_n + (y_{n-2} + y_{n-3})$, wherein: (1) n is a digit index, (2) the binary value $x_n$ represents the nth digit of an input value, such as the disk serial number, to be decoded, and (3) the binary value $y_n$ represents the nth digit of an encoded output value y. In decipher mode the engine uses a decipher function represented by the relation $z_n = y_n + (y_{n-2} + y_{n-3})$, $y_n$ represents the nth digit of the encoded value y to be decoded, the binary value $z_n$ represents the nth digit of the decoded value z.

In the following example, the disk drive firmware uses binary value 110 as the seed ci to encode four digits of the serial number, decimal 9546. The encoded value is hexadecimal CDE7, and the seed ci is transmitted with the encoded serial number from the disk drive firmware to the local host utility.

Cipher Mode

Figure 9:
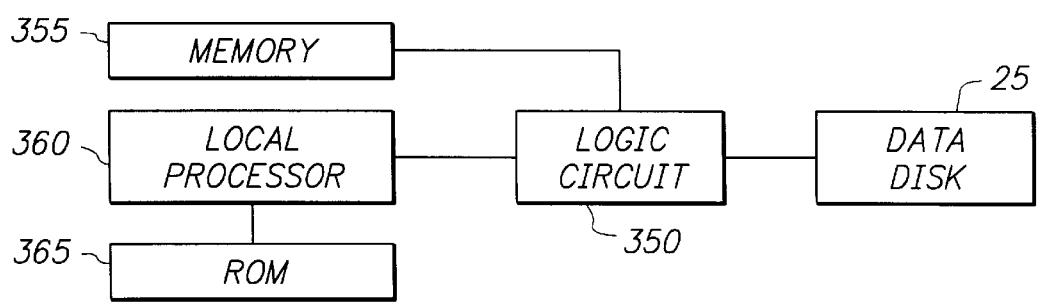
FIG. 9 shows a block diagram of a disk controller including a logic circuit configured by program instructions according to the present invention as interconnected to disk drive components.

Referring to FIG. 9, preferably, the disk controller 30 comprises a logic circuit 350, configured by the program instructions described above. The logic circuit 350 can be an Application Specific Integrated Circuit (ASIC). An ASIC is a device designed to perform a specific function as opposed to a device such as a microprocessor which can be programmed to performed a variety of functions. The circuitry for making the chip programmable is eliminated and only those logic functions needed for a particular application are incorporated. As a result, the ASIC has a lower unit cost and higher performance since the logic is implemented directly in a chip rather than using an instruction set requiring multiple clock cycles to execute. An ASIC is typically fabricated using CMOS technology with custom, standard cell, physical placement of logic (PPL), gate array, or field programmable gate array (FPGA) design methods.

The disk controller 30 can further include a memory device 355, a local microprocessor 360 and a ROM 365, interconnected to the controller logic circuit 350 as shown in FIG. 9. Typically, the ROM 365 includes data and program instructions for the microprocessor 360 to interact with a spindle motor controller and a voice coil motor controller in the disk drive 20, and to oversee transfer of data between the local host 15 and the data disk 25 through the memory device 355. The memory device 360 can include a data buffer for storing data into and retrieving data from the data disk 25. The logic circuit 350, the memory device 355, the ROM 365 or the data disk 25 can be used to store and maintain the aforementioned unique identifying information 75 including the serial number and date code.

| n | | 15 | 14 | 13 | | 12 | | 11 | 10 | 9 | 8 | | 7 | 6 | 5 | 4 | 3 | 2 |
|---|---|----|----|----|---|----|---|----|----|---|---|---|---|---|---|---|---|---|
|   |   | 1  | 0  | -1 | -2 | -3 |  |    |    |   |   |   |   |   |   |   |   |   |
| x | decimal | 9 | | | | 5 | | | | 4 | | | 6 | | | | | |
|   | binary | 1 | 0 | 0 | 1 | 0 | 1 | 0 | 1 | 0 | 1 | 0 | 0 | 0 | 1 | 1 | 0 | |
| y | binary | 1 | 1 | 0 | 0 | 1 | 1 | 0 | 1 | 1 | 1 | 1 | 0 | 0 | 1 | 1 | 1 | 1 1 0 |
|   | hex. | C | | | | D | | | | E | | | 7 | | | | | ci |

In decipher mode below the remote host system utilizes an identical cipher/decipher engine to decode the encoded serial number CDE7 according to the decipher relation $z_n = y_n + (y_{n-2} + y_{n-3})$ described above, to obtain the decoded value z representing the aforementioned four digits of the serial number 9546.

Decipher Mode

| n | 15 | 14 | 13 | 12 | 11 | 10 | 9 | 8 | 7 | 6 | 5 | 4 | 3 | 2 | 1 | 0 | -1 | -2 | -3 |
|---|----|----|----|----|----|----|---|---|---|---|---|---|---|---|---|---|----|----|----|
| y binary | 1 | 1 | 0 | 0 | 1 | 1 | 0 | 1 | 1 | 1 | 1 | 0 | 0 | 1 | 1 | 1 | 1 | 1 | 0 |
| z binary | 1 | 0 | 0 | 1 | 0 | 1 | 0 | 1 | 0 | 1 | 0 | 0 | 0 | 1 | 1 | 0 | | | |
| decimal | 9 | | | | 5 | | | | 4 | | | | 6 | | | | | | |

Other encoding and decoding protocols known to those skilled in the art are also possible and contemplated by the present invention.

The program instructions can be implemented in a high level programming language such as C, Pascal, etc. which is then compiled into object code and linked with object libraries as necessary to generate executable code for the local host system 15 and the remote host system 165. The program instructions can also be implemented in assembly language which is then assembled into object code and linked with object libraries as necessary to generate executable code.

Although the present invention has been described in considerable detail with regard to the preferred versions thereof, other versions are possible. For example, instead of the disk drive 20, other memory and storage devices such as tape cartridges and removable recordable disk drives are also contemplated by the present invention. Therefore, the appended claims should not be limited to the descriptions of the preferred versions contained herein.

What is claimed is:

1. In a data processing system comprising a host system and a memory device including a data storage medium of a predetermined size and corresponding capacity, a secure method of managing available capacity of the storage medium, comprising the steps of:

(a) maintaining an authentication list comprising a plurality of entries containing information including information uniquely identifying a plurality of memory devices;

(b) selecting a section of said data storage medium for data storage, said section having a size representing the available capacity of the memory device;

(c) maintaining verification information in the memory device including information uniquely identifying the memory device; and (d) in response to receipt in the host system of a request for changing the available capacity of the memory device:
   (1) obtaining verification information including said identifying information from said memory device;
   (2) searching said list to find an entry including identification information matching that obtained from the memory device to authorize said change; and
   (3) if a match is found, then: (i) generating a change command for directing the memory device to change said available capacity; (ii) sending the change command to the memory device; and (iii) the memory device executing said change command by steps including changing the size of said section.

2. The method of claim 1, wherein the step of obtaining the verification information from the memory device includes: (i) sending an inquiry command to the memory device requesting said verification information, and (ii) the memory device providing said verification information including said unique identifying information stored therein in response.

3. The method of claim 2, wherein:
   (a) the step of providing said verification information includes encoding said verification information; and
   (b) the step of finding a match in the authentication list further includes:
      (1) decoding the encoded verification information; and
      (2) comparing the decoded verification information with the information in the authentication list entries.

4. The method of claim 3, wherein:
   (a) the step of generating the change command includes:
      (1) encoding the matching information including the identification information found in the authentication list; and
      (2) incorporating said encoded information in the change command; and
   (b) the step of executing the change command includes:
      (1) decoding the encoded information in the change command;
      (2) comparing the decoded information with the verification information in the memory device; and
      (3) if there is a match then changing the size of said section.

5. The method of claim 1, wherein the memory device comprises a data disk drive and the storage medium comprises a data disk.

6. The method of claim 5, wherein the step of changing the size of said section includes increasing the size of said section, thereby increasing the available capacity of the data disk drive for data storage.

7. The method of claim 5, wherein the step of changing the size of said section includes decreasing the size of said section, thereby decreasing the available capacity of the data disk drive for data storage.

8. The method of claim 1, wherein the memory device comprises a tape cartridge and the storage medium comprises a tape.

9. A capacity control system for securely managing available storage capacity of a memory device in a data processing system, the memory device including a data storage medium having a preselected section of a size representing the available capacity of the memory device, and verification information, including identification information uniquely identifying the memory device, stored in the memory device, the capacity control system comprising:

(a) an authentication list comprising a plurality of entries containing information including information uniquely identifying a plurality of memory devices;

(b) a host system configured by program instructions to performs steps including:
   in response to receipt in the host system of a request for changing the available capacity of the memory device:
      (1) sending an identification inquiry command to the memory device requesting verification information including said unique identification information;
      (2) searching said list to find an entry including identification information matching that obtained from the memory device to authorize said change; and
      (3) if a match is found, then: (i) generating a change command for directing the memory device to change said available capacity; and (ii) sending the change command to the memory device; and (c) a logic circuit in the memory device configured by program instructions to perform steps including:
   (i) in response to an identification inquiry command, providing said verification information including said identification information stored in the memory device; and
   (ii) in response to a change command, executing steps including changing the size of said section of the data storage medium.

10. The capacity control system of claim 9, wherein:
(a) the logic circuit program instructions for providing said verification information includes program instructions for encoding said verification information; and
(b) the host system program instructions for finding a match in the authentication list further include program instructions for:
   (1) decoding the encoded verification information, and
   (2) comparing the decoded verification information with the information in the authentication list entries.

11. The capacity control system of claim 10, wherein:
(a) the host system program instructions for generating the change command include program instructions for:
   (1) encoding the matching information found in the authentication list; and
   (2) incorporating the encoded information in the change command; and
(b) the logic circuit program instructions for executing the change command include program instructions for:
   (1) decoding the encoded information in the change command;
   (2) comparing the decoded information with the verification information in the memory device; and
   (3) if there is a match then changing the size of said section of the data storage medium.

12. The capacity control system of claim 9, wherein the memory device comprises a data disk drive and the storage medium comprises a data disk.

13. The capacity control system of claim 12, wherein changing the size of said section includes increasing the size of said section, thereby increasing the available capacity of the data disk drive for data storage.

14. The capacity control system of claim 12, wherein changing the size of said section includes decreasing the size of said section, thereby decreasing the available capacity of the data disk drive for data storage.

15. The capacity control system of claim 9, wherein the memory device comprises a tape cartridge and the storage medium comprises a tape.

16. In a data processing system comprising a remote host system, a local host system and a memory device including a data storage medium of a predetermined size and corresponding capacity, a secure method of managing available capacity of the storage medium, comprising the steps of:
(a) maintaining an authentication list in the remote host system, the list comprising a plurality of entries containing information including information uniquely identifying a plurality of memory devices;
(b) selecting a section of the storage medium for data storage, said section having a size representing the available capacity of the memory device;
(c) maintaining verification information in the memory device including identification information uniquely identifying the memory device,
(d) in response to receipt in the local host system of a request for changing the available capacity of the memory device:
  (1) obtaining verification information including said identifying information from said memory device;
  (2) sending the obtained verification information to the remote host system;
  (3) searching said list in the remote host system to find an entry including information matching that obtained from the memory device to authorize said change; and
  (4) if a match is found, then: (i) generating a change command in the local host system for directing the memory device to change said available capacity; (ii) sending the change command to the memory device; and (iii) the memory device executing said change command by changing the size of said section.

17. The method of claim 16, wherein the step of obtaining the verification information from the memory device includes: (i) sending an inquiry command to the memory device requesting said verification information, and (ii) the memory device providing said verification information including the unique identification information stored therein in response.

18. The method of claim 17, wherein:
(a) the step of providing said verification information includes encoding said verification information; and
(b) the step of finding a match in the authentication list further includes:
  (1) decoding the encoded verification information; and
  (2) comparing the decoded verification information with the information in the authentication list entries.

19. The method of claim 18, further comprising the steps of:
after a match is found, encoding the matching information found in the authentication list and sending the encoded matching information to the local host, wherein:
(a) the step of generating the change command includes incorporating the encoded information from the remote host in the change command; and
(b) the step of executing the change command includes:
  (1) decoding the encoded information in the change command;
  (2) comparing the decoded information with the verification information in the memory device; and
  (3) if there is a match then changing the size of said section.

20. The method of claim 16, wherein the memory device comprises a data disk drive and the storage medium comprises a data disk.

21. The method of claim 20, wherein the step of changing the size of said section includes increasing the size of said section, thereby increasing the available capacity of the data disk drive for data storage.

22. The method of claim 20, wherein the step of changing the size of said section includes decreasing the size of said section, thereby decreasing the available capacity of the hard disk drive for data storage.

23. The method of claim 16, wherein the remote host is interconnected to the local host via a network system.

24. The method of claim 16, wherein the memory device comprises a tape cartridge and the storage medium comprises a tape.

25. A capacity control system for securely managing available storage capacity of a memory device in a data processing system, the memory device comprising a data storage medium including a preselected section having a size representing the available capacity of the memory device, and verification information, including identification information uniquely identifying the memory device, stored in the memory device, the capacity control system comprising:
(a) a remote host system configured by program instructions to perform steps including:
  (1) maintaining an authentication list therein comprising a plurality of entries containing information including information uniquely identifying a plurality of memory devices;
  (2) upon receiving an authentication request for authenticating verification information of a memory device, searching said list to find an entry containing information matching that requested; and
  (3) if a match is found, providing validation information in response to said request, otherwise providing rejection information in response to said request;
(b) a local host system configured by program instructions to perform steps including:
  in response to receipt in the local host system of a request for changing the available capacity of the memory device:
  (1) sending an identification inquiry command to the memory device requesting verification information including said unique identification information;
  (2) sending an authentication request command to the remote host with the verification information including the identification information obtained from the memory device to authorize said change; and
  (3) upon receiving validation information from the remote host performing steps including: (i) generating a change command for directing the memory device to change said available capacity; and (ii) sending the change command to the memory device; and
(c) a logic circuit in the memory device configured by program instructions to perform steps including:
  (1) in response to an identification inquiry command, providing said verification information stored in the memory device; and
  (2) in response to a change command, executing steps including changing the size of said section of the data storage medium.

26. The capacity control system of claim 25, wherein:
(a) the logic circuit program instructions for providing said verification information include program instructions for encoding said verification information; and
(b) the remote host system program instructions for finding a match in the authentication list further include program instructions for:
  (1) decoding the encoded verification information, and
  (2) comparing the decoded verification information with the information in the authentication list.

27. The capacity control system of claim 26, wherein:
(a) the local host program instructions for generating the change command include program instructions for incorporating the encoded information from the remote host system in the change command; and
(b) the logic circuit program instructions for executing the change command include program instructions for:
  (1) decoding the encoded information in the change command;
  (2) comparing the decoded information with the verification information in the memory device; and
  (3) if there is a match, then changing the size of said section of the data storage medium.

28. The capacity control system of claim 25, wherein the memory device comprises a data disk drive and the storage medium comprises a data disk.

29. The capacity control system of claim 28, wherein changing the size of said section includes increasing the size of said section, thereby increasing the available capacity of the hard disk drive for data storage.

30. The capacity control system of claim 28, wherein changing the size of said section includes decreasing the size of said section, thereby decreasing the available capacity of the hard disk drive for data storage.

31. The capacity control system of claim 25, wherein the remote host is interconnected to the local host via a network system.

32. The capacity control system of claim 25, wherein the memory device comprises a tape cartridge and the storage medium comprises a tape.

* * * * *

UNITED STATES PATENT AND TRADEMARK OFFICE
CERTIFICATE OF CORRECTION

PATENT NO.     : 6,195,732 B1
DATED          : February 27, 2001
INVENTOR(S)    : Adams et al.

It is certified that error appears in the above-identified patent and that said Letters Patent is hereby corrected as shown below:

Column 12, claim 9,
Line 10, replace "performs" with -- perform --.

Signed and Sealed this

Twenty-sixth Day of March, 2002

Attest:

Attesting Officer

JAMES E. ROGAN
Director of the United States Patent and Trademark Office